(12) United States Patent
Rijkenberg (10) Patent No.: US 9,920,391 B2
(45) Date of Patent: Mar. 20, 2018

(54) HIGH-STRENGTH HOT-ROLLED STEEL STRIP OR SHEET WITH EXCELLENT FORMABILITY AND FATIGUE PERFORMANCE AND A METHOD OF MANUFACTURING SAID STEEL STRIP OR SHEET

(71) Applicant: TATA STEEL IJMUIDEN B.V., Velsen-Noord (NL)

(72) Inventor: Rolf Arjan Rijkenberg, Haarlem (NL)

(73) Assignee: TATA STEEL IJMUIDEN B.V., Velsen-Noord (NL)

( * ) Notice: Subject to any disclaimer, the term of this patent is extended or adjusted under 35 U.S.C. 154(b) by 272 days.

(21) Appl. No.: 14/758,455

(22) PCT Filed: Feb. 6, 2014

(86) PCT No.: PCT/EP2014/052334
§ 371 (c)(1),
(2) Date: Jun. 29, 2015

(87) PCT Pub. No.: WO2014/122215
PCT Pub. Date: Aug. 14, 2014

(65) Prior Publication Data
US 2015/0354021 A1   Dec. 10, 2015

(30) Foreign Application Priority Data
Feb. 11, 2013   (EP) ..................... 13154825

(51) Int. Cl.
C22C 38/04 (2006.01)
C22C 38/12 (2006.01)
(Continued)

(52) U.S. Cl.
CPC .......... C21D 8/0263 (2013.01); B32B 15/012 (2013.01); B32B 15/013 (2013.01);
(Continued)

(58) Field of Classification Search
None
See application file for complete search history.

(56) References Cited

U.S. PATENT DOCUMENTS

| | | | |
|---|---|---|---|
| 4,400,223 A | | 8/1983 | Heitmann et al. |
| 4,415,376 A | * | 11/1983 | Bramfitt ............... C21D 8/0226 148/320 |
| 2010/0080728 A1 | | 4/2010 | Ikeda et al. |

FOREIGN PATENT DOCUMENTS

| | | | |
|---|---|---|---|
| CA | 2795714 | * 10/2011 | ............... C21D 9/46 |
| DE | 1558445 A1 | 8/1973 | |

(Continued)

OTHER PUBLICATIONS

Machine-English translation of JP2003-089843, Shiozaki Takeshi et al., Mar. 28, 2003.*

(Continued)

*Primary Examiner* — Deborah Yee
(74) *Attorney, Agent, or Firm* — Vorys, Sater, Seymour and Pease LLP (57) ABSTRACT

A high-strength hot-rolled steel strip or sheet with tensile strength of 570 to 870 MPa and an excellent combination of total elongation, stretch-flange formability, as well as fatigue resistance and to a method of manufacturing the steel strip or sheet and a chassis part made thereof.

22 Claims, 7 Drawing Sheets

(51) Int. Cl.

| | | |
|---|---|---|
| *C22C 38/02* | (2006.01) | |
| *C22C 38/06* | (2006.01) | |
| *C21D 8/02* | (2006.01) | |
| *C21D 8/04* | (2006.01) | |
| *C21D 9/46* | (2006.01) | |
| *C21D 9/48* | (2006.01) | |
| *C23C 2/06* | (2006.01) | |
| *C23C 2/12* | (2006.01) | |
| *C21D 9/52* | (2006.01) | |
| *C23C 2/02* | (2006.01) | |
| *B32B 15/01* | (2006.01) | |
| *C22C 38/00* | (2006.01) | |
| *C22C 38/14* | (2006.01) | |
| *C21D 6/00* | (2006.01) | |
| *C21D 6/02* | (2006.01) | |

(52) U.S. Cl.
CPC ............ *C21D 8/0226* (2013.01); *C21D 9/46* (2013.01); *C21D 9/52* (2013.01); *C22C 38/00* (2013.01); *C22C 38/001* (2013.01); *C22C 38/02* (2013.01); *C22C 38/04* (2013.01); *C22C 38/06* (2013.01); *C22C 38/12* (2013.01); *C22C 38/14* (2013.01); *C23C 2/02* (2013.01); *C23C 2/06* (2013.01); *C23C 2/12* (2013.01); *C21D 6/005* (2013.01); *C21D 6/008* (2013.01); *C21D 6/02* (2013.01); *C21D 2211/004* (2013.01); *C21D 2211/005* (2013.01); *Y10T 428/12757* (2015.01); *Y10T 428/12799* (2015.01)

(56) References Cited

FOREIGN PATENT DOCUMENTS

| | | | |
|---|---|---|---|
| EP | 1338665 A1 | 8/2003 | |
| EP | 2105514 A1 | 9/2009 | |
| EP | 2267175 A1 | 12/2010 | |
| JP | 2003-089843 | * 3/2003 | ............ C22C 38/00 |
| JP | 2004143518 A | 5/2004 | |

OTHER PUBLICATIONS

International Search Report dated Apr. 16, 2014 from International Application PCT/EP2014/052334 to TATA STEEL IJMUIDEN BV filed Feb. 6, 2014.

* cited by examiner

HIGH-STRENGTH HOT-ROLLED STEEL STRIP OR SHEET WITH EXCELLENT FORMABILITY AND FATIGUE PERFORMANCE AND A METHOD OF MANUFACTURING SAID STEEL STRIP OR SHEET

CROSS-REFERENCE TO RELATED APPLICATIONS

This is a § 371 US National Stage Application of International Application No. PCT/EP2014/052334 filed on Feb. 6, 2014, claiming the priority of European Patent Application No. 13154825.7 filed on Feb. 11, 2013.

This invention relates to a high-strength hot-rolled steel strip or sheet with tensile strength of 570 to 870 MPa and an excellent combination of total elongation, stretch-flange formability, as well as fatigue resistance and to a method of manufacturing said steel strip or sheet.

Enhancement of formability at elevated strength levels is desirable for widespread markets. In the automotive industry in particular, where legislation is driving improvements in fuel economy and safety, there is a move towards stronger, formable high-strength steels. High-strength and ultra-high strength strip steel provides automotive manufacturers potential for down weighting vehicle structures and the opportunity for countering weight increases arising from the move to electric and hybrid vehicles. In addition, high- and ultra-high strength steels play a critical role in determining the performance and crash worthiness of modern passenger vehicles.

In recent years so-called Multi-Phase steels have been developed to meet the requirements of high strength and formability. Such steels, including Dual Phase (DP) steels (comprising Ferrite and Martensite) and Transformation-Induced Plasticity (TRIP) steels (comprising Ferrite, Bainite and Retained-Austenite) deliver high uniform and total elongations at high strengths.

Although, for many applications, tensile elongation may be considered a key indicator of formability, other parameters may be critical for some forming routes and performance in service. In particular, high stretched-edge ductility (hole expansibility) may be of critical importance for widespread automotive applications within the body in white and chassis and suspension. Conventional multi-phase microstructures, such as those found in DP and TRIP steels, comprising mixtures of hard and soft phases whilst delivering high tensile elongation, generally perform poorly in stretched-edge ductility tests.

More recent effort has been devoted to developing new classes of steel for which stretched-edge ductility is significantly improved. Such steels, including Nano-Precipitated Ferritic steels, Ferrite-Bainite steels, Complex-Phase steels and so-called third Generation AHSS (Advanced High-Strength Steels), are designed to find a better balance between tensile ductility and stretched-edge ductility. Complex-Phase steels are the most commercially exploited of these variants both in cold-rolled annealed and hot-rolled conditions.

The microstructures of Complex-Phase steels comprise Ferrite with Bainite and Martensite. Such structures exhibit much improved stretched-edge ductility compared to DP steels, albeit at the expense of some tensile ductility. However, in some scenarios exchange of tensile ductility for stretched-edge ductility is warranted. Examples include roll formed parts where bendability rather than stretchability is required, parts formed from blanks in which holes have been pre-punched, parts for which the design leads to high edge deformation during press forming.

Complex-Phase steels also generally exhibit higher yield strengths prior to forming than do DP or TRIP steels. High yield ratios prior to forming may also be advantageous with respect to shape control in roll forming, achieving desired strength in formed parts which are subjected to limited deformation and achieving uniform strength throughout a formed component. High yield strength may also be beneficial in crash. High yield strength and greater uniformity of microstructure may also be beneficial in terms of fatigue performance, which is of particular importance in chassis and suspension applications.

The complex nature of hot-rolled CP steels demands tight control of hot-strip mill process conditions. Three phases must be formed on the run-out-table or on the coil. Failure to achieve the required complex cooling patterns may lead to an unacceptable variation in mechanical properties from coil to coil and within a coil. Chemistries that are insensitive to process variations and that enable consistent properties from coil to coil and within a coil are a key requirement for production of commercial CP steels.

EP1338665 discloses a titanium-molybdenum steel for this purpose. Molybdenum is an expensive alloying element and requires separation of scrap material in an integrated steel works to prevent the re-introduction of molybdenum bearing scrap into the steel circulation, which is disadvantageous for the production of high r-value cold-rolled packaging steels. A titanium-only solution is provided in EP2267175. However, the use of titanium requires hot charging for conventional hot-strip rolling. In addition, large titanium-based inclusions may impair both stretch-flange formability as well as deteriorate fatigue performance. Furthermore, titanium-based steel compositions are not very suitable for steel production on a Compact Strip Production (CSP) facility, in which casting and hot-rolling are integrated. Reason for this is that titanium leads to clogging during casting in a CSP production line.

The objective of the invention is to provide a high-strength hot-rolled steel strip or sheet with an excellent combination of tensile strength, total elongation, stretch-flange formability, and fatigue resistance without using molybdenum as an alloying element. With tensile strength the ultimate tensile strength is meant, usually indicated with TS or Rm.

A further objective of the invention is to provide a high-strength hot-rolled steel strip or sheet with an excellent combination of tensile strength, total elongation, stretch-flange formability, and fatigue resistance without using titanium as an alloying element.

A further objective of the invention is to provide a high-strength hot-rolled steel strip or sheet with an excellent combination of tensile strength, total elongation, stretch-flange formability, and fatigue resistance that can be produced in a conventional hot strip mill from thick slab as well as in a thin slab, direct rolling facility without requiring adaptations in chemical composition.

DETAILED DESCRIPTION OF THE PREFERRED EMBODIMENTS

One or more of the objects can be reached by providing a high-strength hot-rolled steel strip or sheet with a maximum tensile strength of 570 to 870 MPa and an excellent combination of total elongation, stretch-flange formability, and fatigue resistance, comprising (in weight percent):
 between 0.015 and 0.075% C;
 between 1.0 and 2.0% Mn;
 between 0.02 and 0.30% V;
 optionally between 0.01 and 0.08% Nb;
 at most 0.5% Si;
 at most 0.06% P;
 at most 0.01% S;
 at most 0.1% Al_sol;
 at most 0.020% N;
 optionally calcium in an amount consistent with a calcium treatment for inclusion control;
 balance of Fe and inevitable impurities;
wherein the contents of Nb, V, Al_sol, C and N satisfy <eq.1> and <eq.2>:

$$0.9 \leq \left( \frac{\left(\frac{Nb}{93}\right) + \left(\frac{V}{51}\right) + \left(\frac{Al\_sol}{27}\right)}{\left(\frac{C}{12}\right) + \left(\frac{N}{14}\right)} \right) \leq 2.2 \quad \langle eq.\ 1 \rangle$$

$$0.9 \leq \left( \frac{\left(\frac{Nb}{93}\right) + \left(\frac{V}{51}\right)}{\left(\frac{C}{12}\right)} \right) \leq 2.0 \quad \langle eq.\ 2 \rangle$$

wherein the steel sheet has a precipitation-strengthened and predominantly single-phase ferritic microstructure, in which the fraction of ferrite is not lower than 97%.

The steel according to the invention contains titanium and molybdenum only as impurities.

The steel according to the invention offers high strength in combination with both high tensile elongation as well as high hole-expansion capacity (i.e., stretch-flange formability). This is achieved by using a single-phase ferritic microstructure. This means that the volume fraction of ferrite in the microstructure should not be lower than 97%. The ductile ferritic microstructure is able to accommodate both high tensile elongation as well as high hole-expansion capacity. A high density of V and/or (Nb,V) carbonitride precipitates provides sufficient strength. Apart from an excellent combination of both high tensile elongation as well as high hole-expansion capacity, the single-phase ferritic microstructure offers superior fatigue performance. The combination of high total elongation and high hole-expansion capacity reduces the risk of failure as a result of edge cracking during pressing or during service.

Conventional HSLA/AHSS (Dual-Phase, Ferrite-Bainite, or Complex-Phase) have a mixed microstructure comprising a ferritic matrix and carbon-rich phase constituents. The difference in hardness between the matrix and carbon-rich phase constituents promotes micro-void nucleation upon deformation and subsequent crack growth. As a consequence, these grades have both inferior hole-expansion capacity and fatigue performance.

Single-phase ferritic grades, such as those disclosed in EP1338665 rely on the use of molybdenum to achieve high (precipitation) strength. The present invention avoids the use of molybdenum, since it is a very expensive alloying element.

The single-phase ferritic grade as disclosed in EP 2267175 relies on strength from the use of titanium without the use of molybdenum and obtains its precipitation strengthening from TiC. Specified tensile strength range in this patent is 520-720 MPa. Nitrogen levels are deliberately kept low in order to avoid large TiN inclusions, which may impair both stretch-flange formability as well as fatigue performance.

The present invention deliberately avoids the use of titanium, and relies for precipitation strengthening on the use of vanadium, or on the use of vanadium and niobium. In contrast to the concept of EP 2267175, the present invention relies on precipitation with both carbon as well as nitrogen, i.e., carbo-nitrides. The use of nitrogen increases the effectiveness of precipitation (in particular that of vanadium). Advantage also is that (carbo)nitrides are less prone to coarsening (i.e., Ostwald ripening) than carbides, reducing a loss in strengthening during coiling or a subsequent thermal treatment.

The aluminium in solid solution has to be low in order to prevent loss of nitrogen as a result of the formation of AlN and to have as much as possible nitrogen available for the formation of carbonitrides with vanadium or vanadium and niobium. The total aluminium content in the steel (Al_tot) consists of aluminium bound into oxides (Al_ox) as a result of the killing of the steel, and of aluminium in solid solution (Al_sol). Al_sol should be at most 0.1 wt % and preferably at most 0.03 wt % and more preferably be at most 0.01 wt %. Al_sol is sometimes referred to as acid soluble aluminium, because it dissolves in acid whereas the aluminium bound to oxide (alumina) does not.

High nitrogen levels are preferable in order to increase the efficiency of vanadium for the precipitation process and to increase its contribution to precipitation strengthening. Nitrogen is important since its presence promotes nitride formation. Nitrides are less prone to coarsening than carbides and hence less precipitation strength will be lost during coiling. Care must be taken that all nitrogen as well as all carbon is consumed in the precipitation process. The latter is important for the prevention of the formation of cementite or pearlitic constituents, which may impair both stretch-flange formability as well as fatigue performance. For that reason N content should be at most 0.02 wt %. However, to optimise precipitation strengthening, N content should preferably be at least 0.01 wt %.

The composition needs to deliver the right amount of C, N, Al_sol, V and optionally Nb as well as the right balance between (C+N) and (Nb+V) to get sufficient precipitation strengthening and avoiding the formation of cementite and/or pearlite. The inventors found that when the composition satisfies <eq.1> and <eq.2> that the composition is optimally balanced with respect to these elements. The C content is in the range of 0.015 and 0.075 wt % with a V content ranging from 0.02 and 0.30 wt %. The use of Nb is optional. Its use is beneficial to provide some additional precipitation strengthening but foremost to provide grain refinement of the ferritic microstructure for additional strength and improvement of fatigue properties as well as welding performance. If Nb is used, its content should be at least 0.01 wt % to be significantly effective and at most 0.08 wt % to avoid too high rolling loads without significant compensation in terms of grain refinement and properties.

Silicon is beneficial for solid-solution strengthening and suppressing the formation of cementite. The latter is highly relevant since pearlite and/or cementite impair stretch-flange formability and fatigue properties. However, a low Si content is desired to reduce rolling loads and to avoid scale issues, which may impair fatigue properties. Therefore, Si content should not exceed 0.5 wt %.

Mn is important because of: (a) solid-solution strengthening, (b) suppressing the ferrite transformation temperature and (c) slowing down the transformation rate. Factors (b) and (c) are important to achieve sufficient precipitation strengthening. Therefore, Mn content should be at least 1.0 wt %. However, a too high Mn content will lead to segregation, which impairs stretch-flange formability. Hence, Mn content should be in the range of 1.0 and 2.0 wt %. Preferably, the Mn content is at least 1.4 wt %.

A low sulphur content will improve formability. Therefore efforts to realize a low sulphur content are recommended to obtain high hole-expansion capacity. An optional calcium treatment for inclusion control, particularly of MnS, is preferable. S content should be at most 0.01 wt %.

P provides solid-solution strengthening. However, at high levels, P segregation will impair stretch-flange formability. Therefore, P content should be at most 0.06 wt %.

The microstructure is a substantially single-phase ferritic microstructure. The volume fraction of ferrite in the microstructure is not lower than 97% (in volume), preferably not lower than 99% and should most preferably be as close to 100% as possible. The ferrite is precipitation strengthened with carbides, nitrides and/or carbonitride precipitates containing vanadium or vanadium and niobium. The single-phase nature of the microstructure is crucial. A typical conventional HSLA microstructure is not single-phase, but instead consists of a ferritic matrix with cementite and/or pearlite as additional phase constituents. A dual-phase or complex-phase structure is also not single-phase, but instead consists of a ferritic matrix with additional phase constituents such as martensite, bainite, retained-austenite, etc. The single-phase nature of our invention is crucial to achieve high hole-expansion capacity. The single-phase ferritic microstructure should preferably be polygonal ferrite. With a fully polygonal ferrite microstructure the optimum balance between total elongation and hole-expansion capacity will be obtained. Although irregular, bainitic or acicular ferrite may be allowable, the inventors found that their presence may come at the expense of either total elongation or hole-expansion capacity, even though the strength and other properties remain at an adequate level.

The steel casting and hot rolling process is generally similar to that of conventional HSLA steels. The process should be designed to ensure that a single-phase ferritic microstructure is achieved, which is sufficiently precipitation strengthened with (carbide, nitride and/or) carbonitride precipitates containing V or V and Nb. The presence of cementite and/or pearlite must be avoided since it impairs hole-expansion capacity as well as fatigue resistance.

The slabs are reheated to 1050-1250° C. and hot-rolled with a finishing rolling temperature of the Ar$_3$ transformation point or higher, and coiled in the temperature range between 700 and 580° C. To avoid coarsening of precipitates and loss of strength, actively cooling of the coil after coiling is an option, either by immersing the coil in a water basin or by actively spraying the coil with water (e.g. a coil shower). The hot rolled steel sheet is preferably cooled to the coiling temperature at an average cooling rate of at least 10° C./s and/or at most 600° C./s. Preferably the hot rolled steel sheet is cooled to the coiling temperature at an average cooling rate of at least 40° C./s and/or at most 150° C./s.

Apart from in a conventional hot-strip mill, this type of product could be produced on a thin slab casting and direct rolling mill such as those of the CSP type since the composition does not rely on the use of Ti. It is known that micro-alloying with Ti may lead to problems with casting on a CSP type of installation.

Material can be provided with a zinc coating or a zinc alloy coating via a heat-to-coat cycle (or electro-galvanising) wherein the zinc alloy coating preferably comprises aluminium and/or magnesium as its main alloying elements.

The steel strip or sheet according to the invention comes in three categories i, ii and iii:
  i. Steel with a tensile strength of at least 580 MPa and a hole-expansion ratio of at least 100%, and in which tensile strength (TS) and total elongation (El), and sheet thickness t (mm) satisfy the equation of (TS×El)/t$^{0.2}$>11000, or
  ii. Steel with a tensile strength of at least 650 MPa and a hole-expansion ratio of at least 80%, and in which tensile strength (TS) and total elongation (El), and sheet thickness t (mm) satisfy the equation of (TS×El)/t$^{0.2}$>10000, or
  iii. Steel with a tensile strength of at least 780 MPa and a hole-expansion ratio of at least 60%, and in which tensile strength (TS) and total elongation (El), and sheet thickness t (mm) satisfy the equation of (TS×El)/t$^{0.2}$>9000

Preferably the total elongation (El determined at a JIS5 tensile specimen of 1 mm thickness) is not lower than 14%, preferably not lower than 16%, most preferably not lower than 18%.

The invention is also embodied in the use of the steel sheet according to the invention to produce a chassis part.

The invention will now be further explained by means of the following non-limitative examples 1 and 2.

Example 1

Steels A to E having the chemical compositions shown in Table 1 were hot-rolled under the conditions given in Table 2, producing steel sheets 1 to 12 with a thickness in the range of 2.5 to 3.1 mm (YS=Yield Strength; UTS=Ultimate Tensile Strength; YR=Yield Ratio; El=Elongation). The hot-rolled steel sheets were pickled prior to testing. Reported tensile properties are based on JIS No. 5 geometry with tensile testing parallel to rolling direction and applying a tensile strength test to the test piece according to EN 10002-1/ISO 6892-1. In some cases, the surface roughness of the tensile test pieces was removed by thinning the test piece using gentle grinding. To determine the hole-expanding ratio λ which is considered as a criterion for stretch flangeability, three square steel samples sized 90×90 mm$^2$ were cut out from each steel sheet, followed by making a hole of 10 mm in diameter in the samples by punching. Hole-expansion testing of the samples was done with upper burring. A conical punch of 60° was pushed up from below and the hole diameter $d_f$ was measured when a through-thickness crack formed. The hole-expansion ratio λ was calculated using the formula below with $d_0$=10 mm:

$$\lambda = \frac{d_f - 10}{10} \times 100\%$$

The microstructure was identified by using optical microscopy to identify the phase constituents in the microstructure and to assess the total fraction of cementite and/or pearlite. The tensile properties and hole-expansion ratios of the examined steel sheets are shown in Table 2. Also shown in Table 2 is an assessment of the type of microstructure of the examined steel sheets. The microstructure is assigned as F if the ferrite fraction is 97% or more. In case the fraction cementite and/or pearlite is more than 3%, the microstructure is assigned as F+C+P. The fatigue properties of steel sheets 3B and 12E are also shown in Table 2. Fatigue properties and S-N fatigue curves (Stress (in MPa) as a function of cycles to failure (Nf)) were measured with a fatigue stress ratio R of −1 (fully reversed tension/compression loading) and fatigue testing parallel to rolling direction. The S-N fatigue testing was carried out according to the British Standard Methods of Fatigue Testing BS3518 Part 1. Reported in Table 2 are the fatigue strength at $1 \times 10^5$ and $5 \times 10^5$ cycles, defined as the stress range with a stress ratio R of −1 for which failure occurs at $1 \times 10^5$ and $5 \times 10^5$ cycles.

Figure 1:
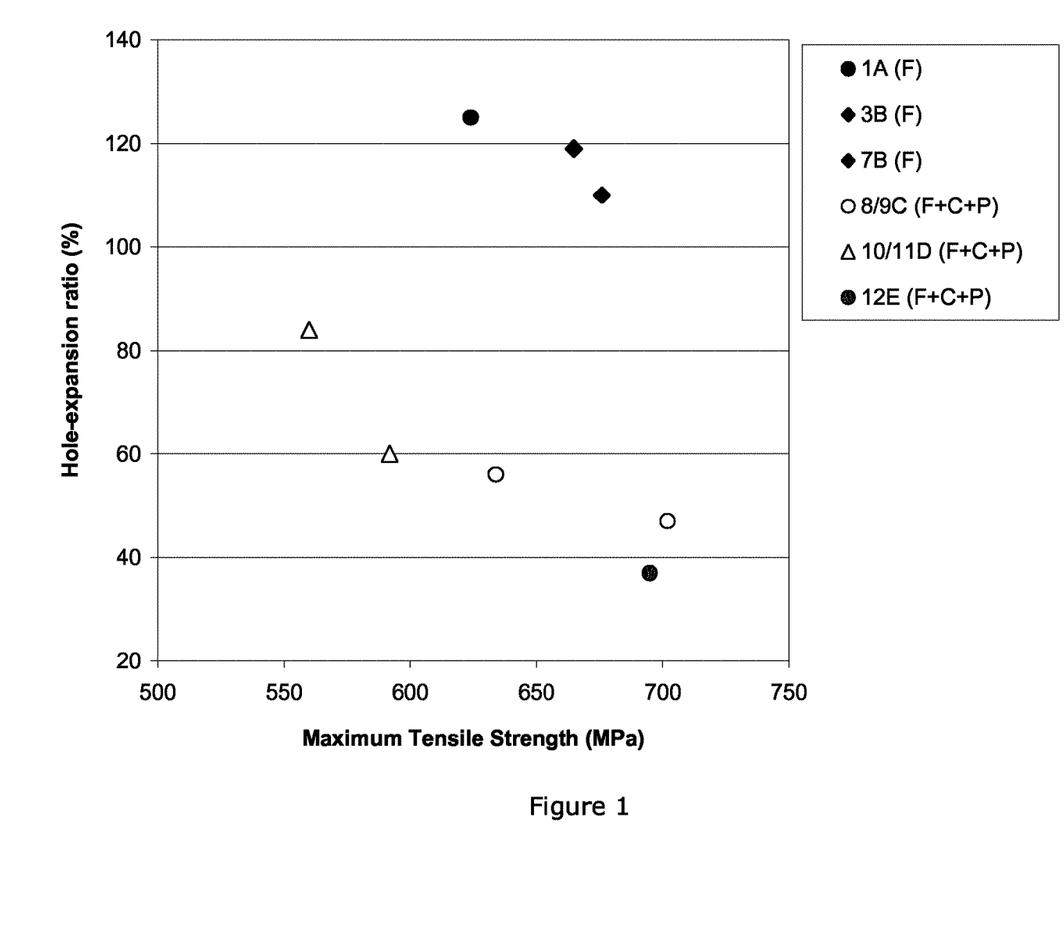
FIG. 1 shows a plot of hole expansion ratio vs. maximum tensile strength for Example 1.
Figure 2:
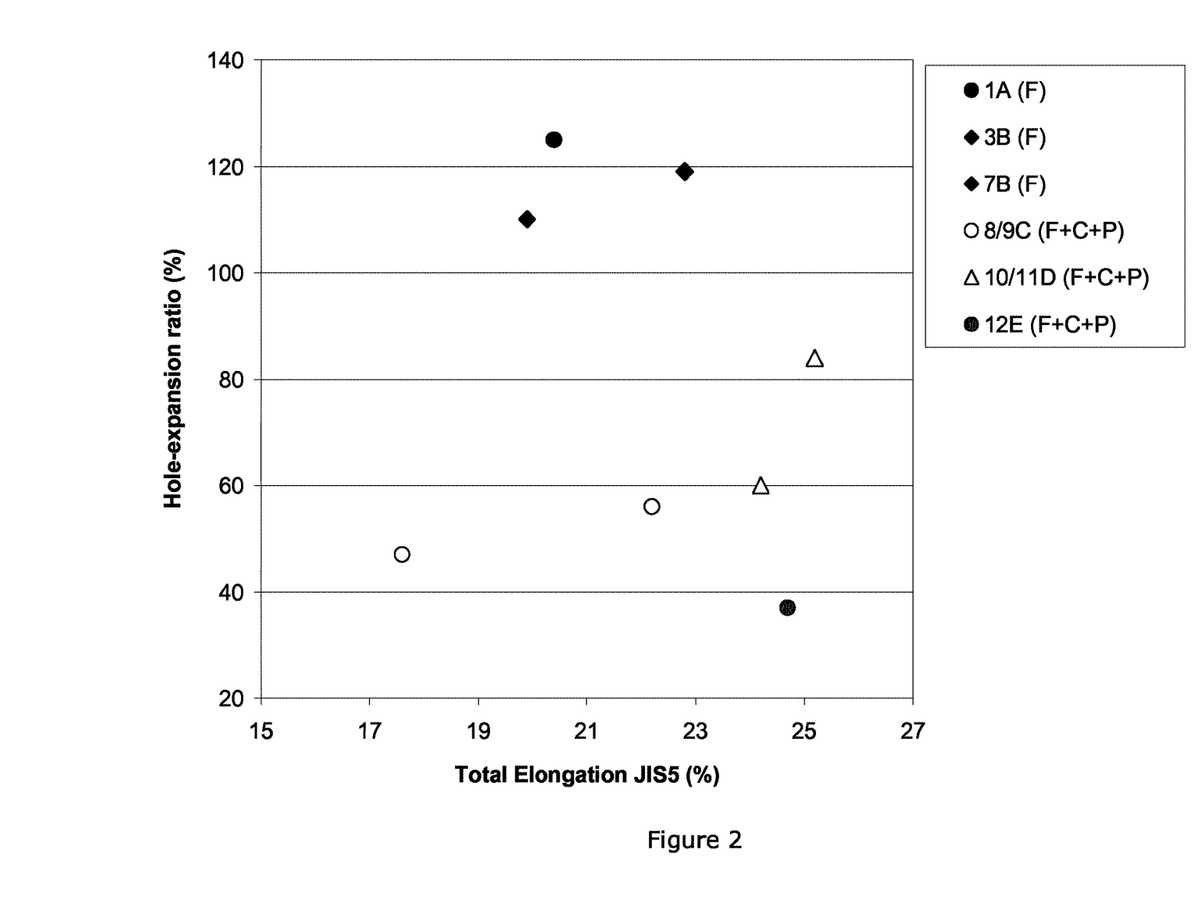
FIG. 2 shows a plot of hole expansion ratio against total elongation for Example 1.
Figure 3:
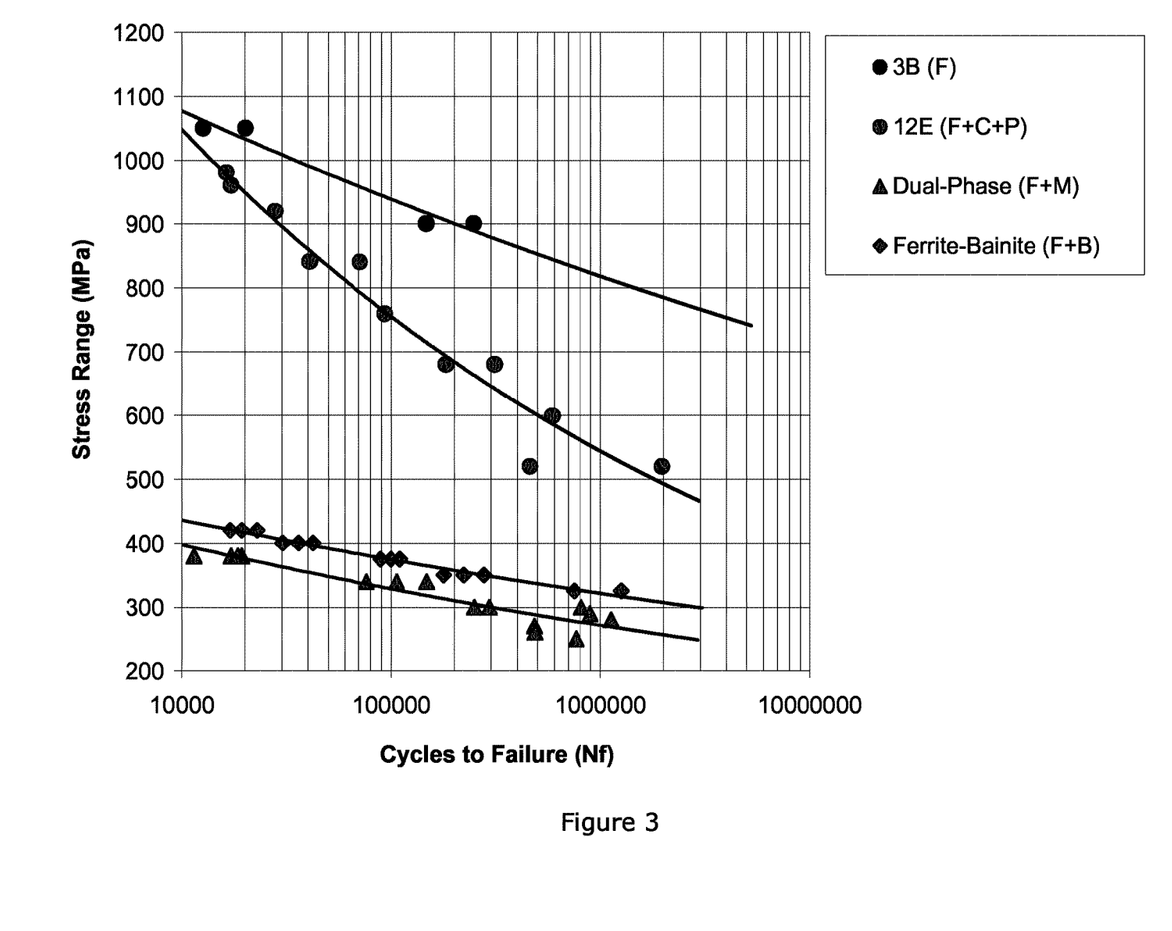
FIG. 3 shows a plot of S-N fatigue curves for Example 1.

FIG. 1 shows a plot of hole-expansion ratio against the tensile strength for steel sheets 1A, 3B, 7B with single-phase ferrite microstructures and for steel sheets 8/9C, 10/11D, and 12E, all with mixed microstructures, comprising ferrite, cementite, and pearlite. The data shown in FIG. 1 clearly illustrates the beneficial influence of a single-phase ferrite microstructure on hole-expansion ratio. FIG. 2 shows a plot of hole-expansion ratio against the total elongation (JIS No. 5) for steel sheets 1A, 3B, 7B with single-phase ferrite microstructures and for steel sheets 8/9C, 10/11D, and 12E, all with mixed microstructures, comprising ferrite, cementite, and pearlite. Again, the data shows the beneficial influence of a single-phase ferrite microstructure on a superior balance between hole-expansion ratio and total elongation. FIG. 3 shows S-N fatigue curves (R=−1) of steel sheet 3B with a single-phase ferrite microstructure and that of steel sheet 12E with a mixed microstructure, comprising ferrite, pearlite and cementite. Also shown in FIG. 3 are the S-N curves of a hot-rolled Dual-Phase (DP) steel (2.7 mm) with a microstructure comprising ferrite and martensite and that of a hot-rolled Ferrite-Bainite (FB) steel (3.3 mm), with a microstructure comprising ferrite and bainite. The thickness and maximum tensile strengths of these two steels are in the same region as that of steel sheets 1 to 12 (see Table 2). Yield strength and maximum tensile strength of the DP steel are 434 and 647 MPa (YR=0.67), respectively, and the yield and maximum tensile strength of the FB steel are 532 and 638 MPa (YR=0.83), respectively. The S-N curves of the DP and FB steels are considered as typical for these type of steel grades with their multi-phase type of microstructures. A comparison between the S-N curves plotted in FIG. 3 clearly illustrates the beneficial influence of a single-phase ferrite microstructure on fatigue strength.

Example 2

Steels A to K having the chemical compositions shown in Table 3 were hot-rolled under the conditions given in Table 4, producing steel sheets 1 to 28 with a thickness in the range of 2.6 to 3.6 mm. Samples were prepared and tested similar to those of example 1. The tensile properties and hole-expansion ratios of the examined steel sheets are shown in Table 4. Also shown in Table 4 is an assessment of the type of microstructure of the examined steel sheets. The microstructure is assigned as F if the ferrite fraction is 97% or more. In case the fraction cementite and/or pearlite is more than 3%, the microstructure is assigned as F+C+P. The fatigue properties of steel sheets 9B, 10B, 11B and 22E are also shown in Table 4. Fatigue properties and S-N fatigue curves (Stress (in MPa) as a function cycles to failure (Nf)) were measured with a fatigue stress ratio R of −1 (fully reversed tension/compression loading) and fatigue testing parallel to rolling direction. The S-N fatigue testing was carried out according to the British Standard methods of Fatigue Testing BS3518 Part 1. Reported in Table 4 are the fatigue strength at $1 \times 10^5$ and $5 \times 10^5$ cycles, defined as the stress range with a ratio R of −1 for which failure occurs at $1 \times 10^5$ and $5 \times 10^5$ cycles.

Figure 4:
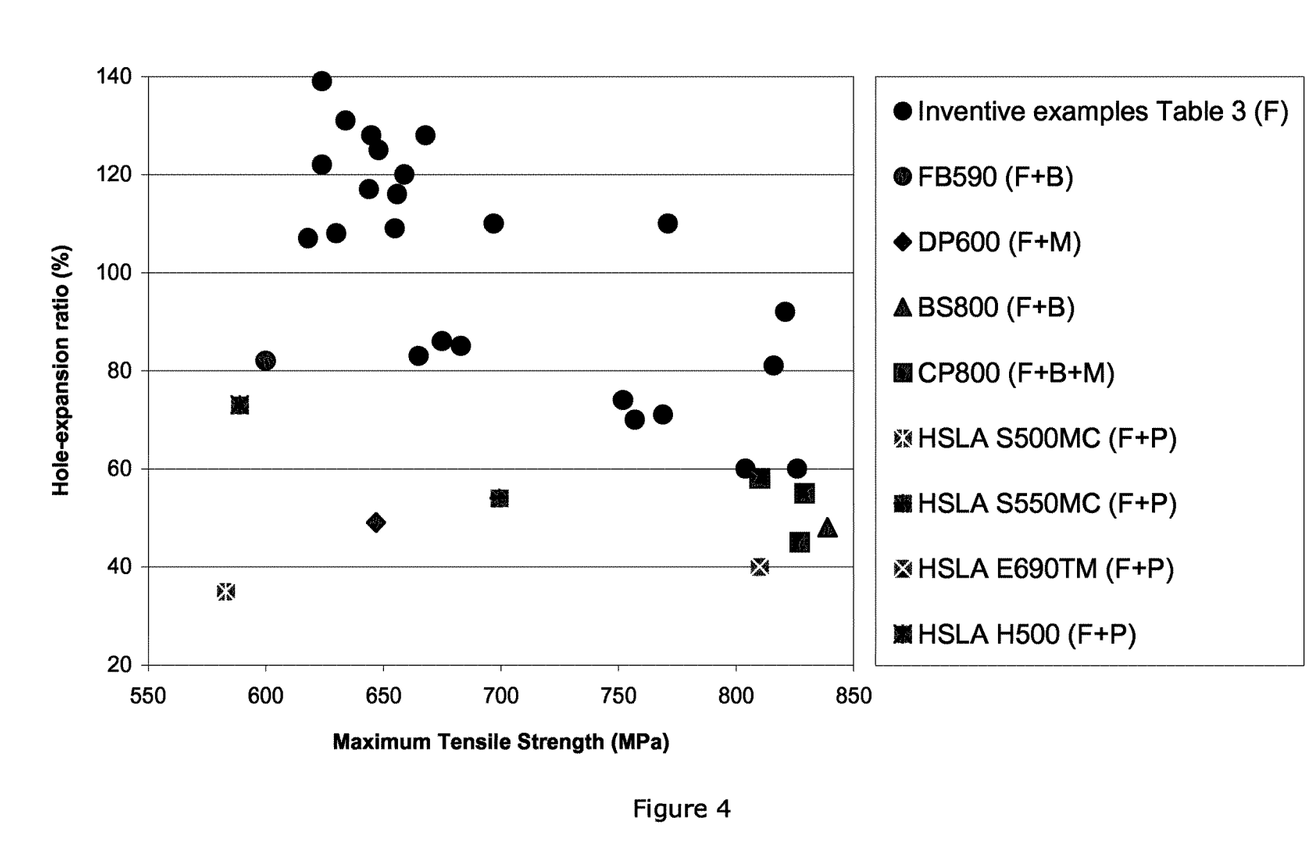
FIG. 4 shows a plot of hole expansion ratio vs. maximum tensile strength for Example 2.
Figure 5:
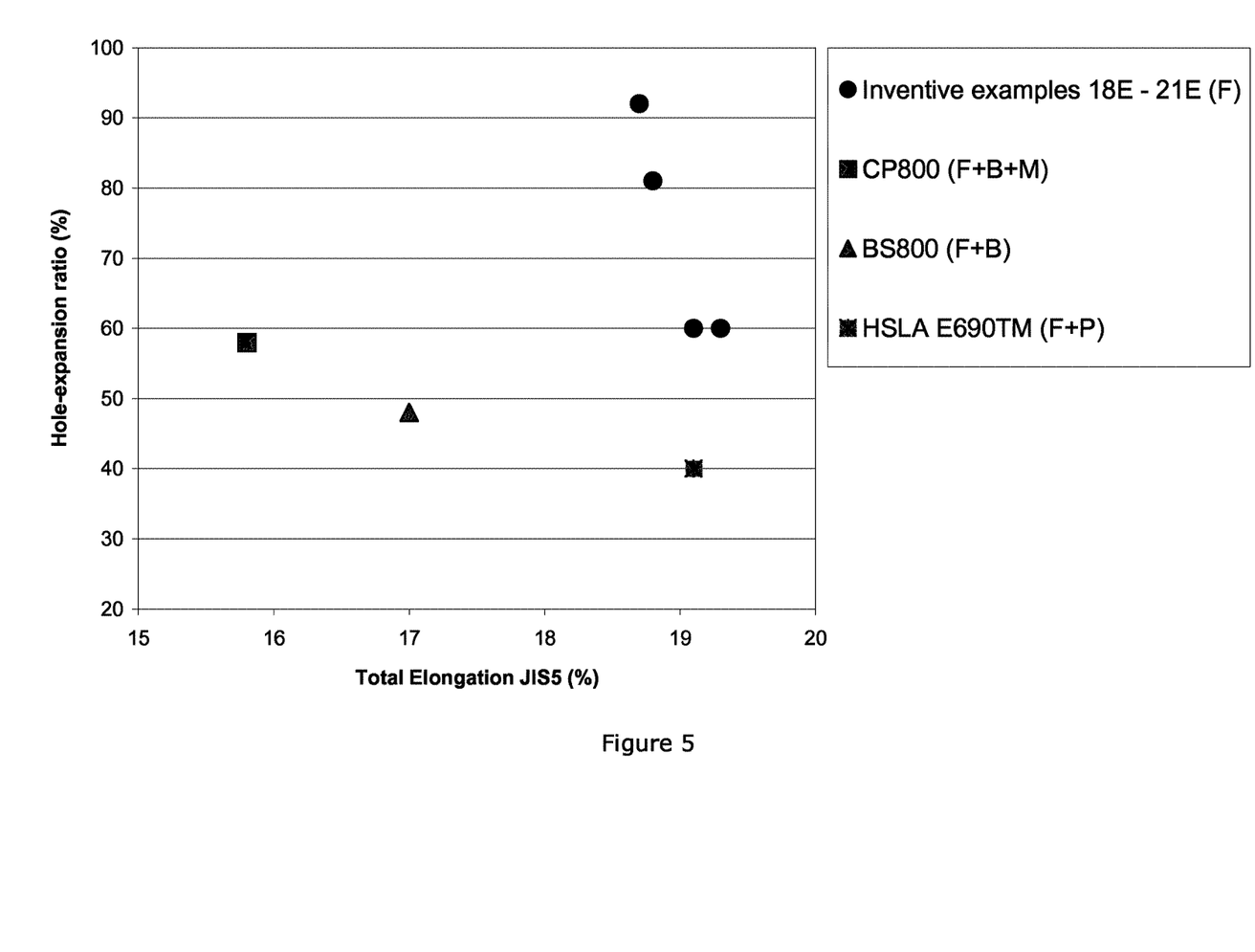
FIG. 5 shows a plot of hole expansion ratio against total elongation.
Figure 6:
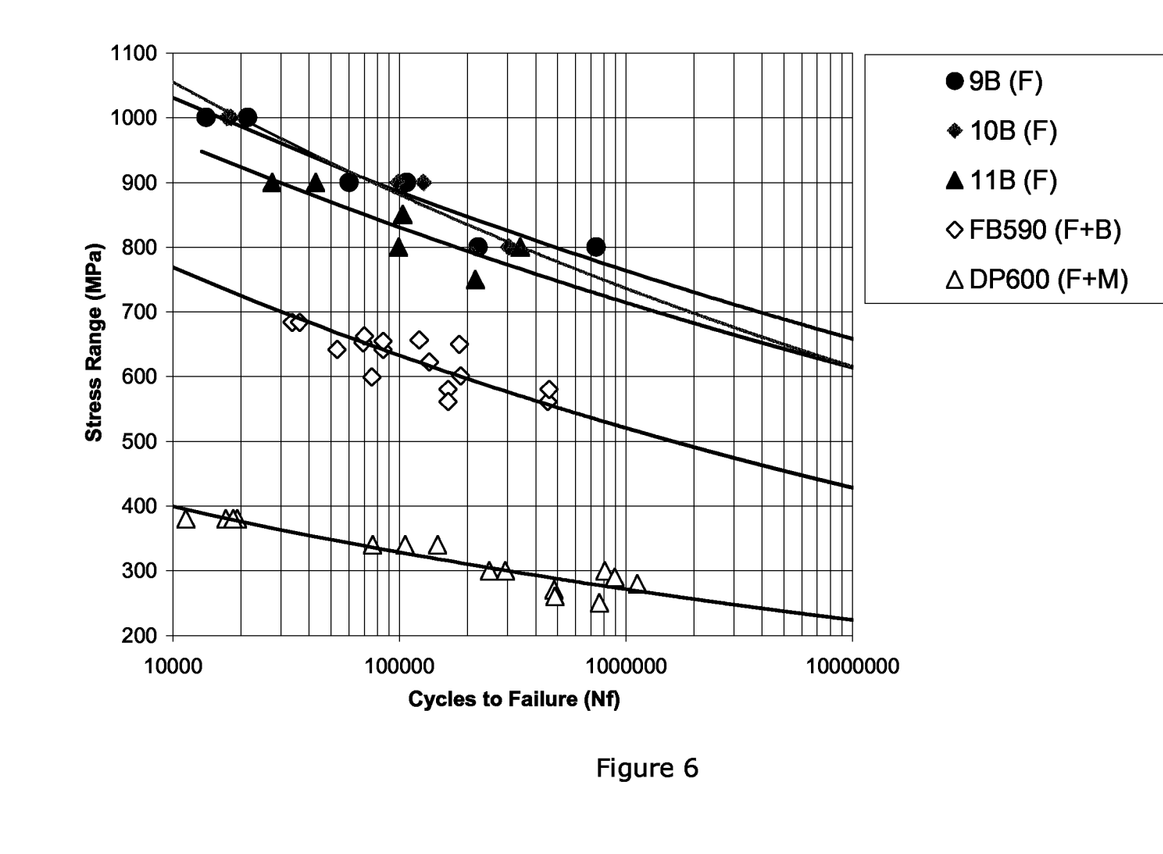
FIG. 6 shows a plot of S-N fatigue curves for Example 2.
Figure 7:
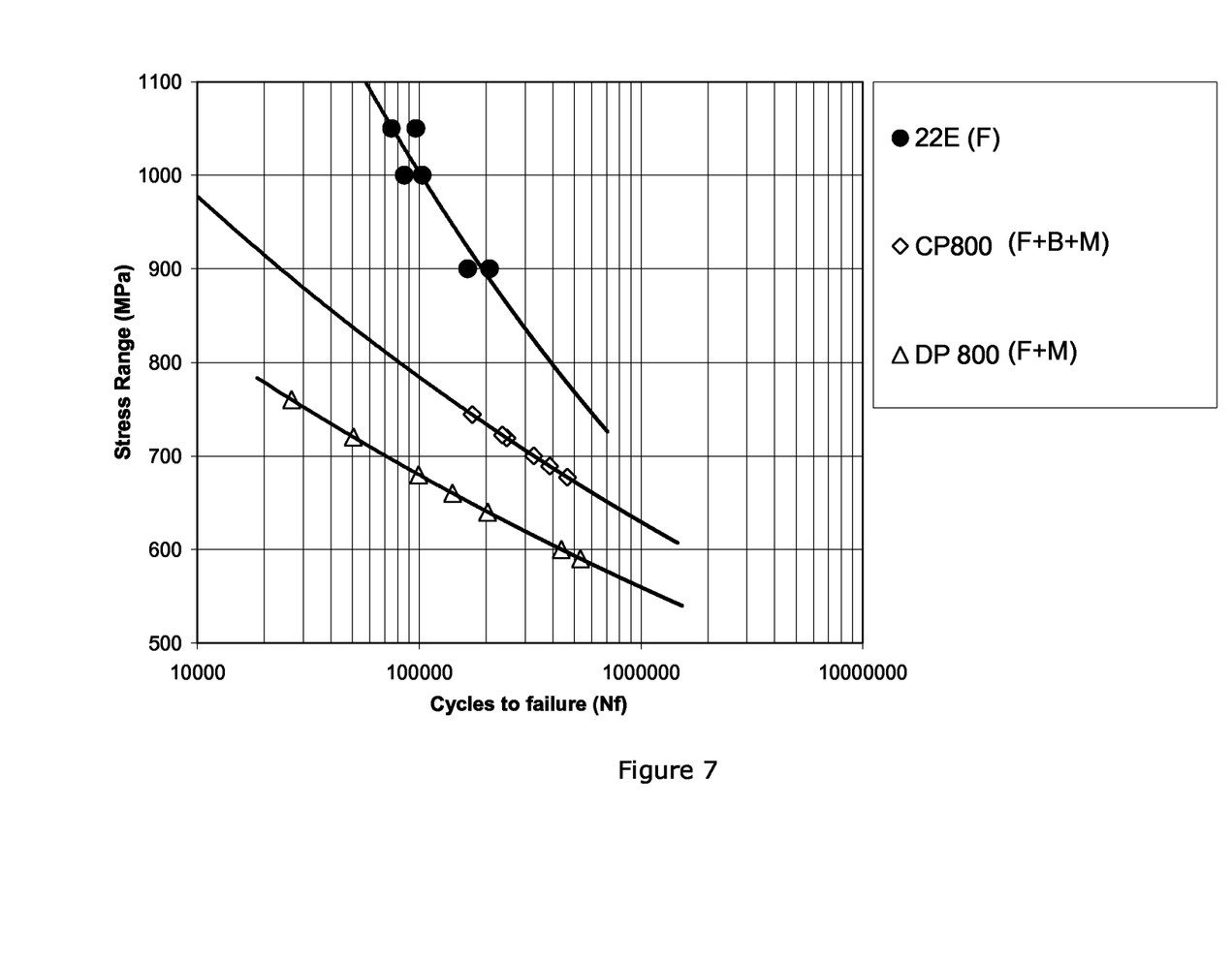
FIG. 7 shows a plot of S-N fatigue curves for Example 2.

FIG. 4 shows a plot of hole-expansion ratio against the tensile strength for steel sheets 1A to 28K (inventive examples) listed in Table 4. All of these steel sheets have a single-phase ferrite microstructure. Also shown in FIG. 4 is benchmark data obtained from commercial steel sheets with multi-phase microstructures. This data set comprises hot-rolled High-Strength Low-Alloy (HSLA) steels, Ferrite-Bainite (FB) steel, Dual-Phase (DP) steel, Complex-Phase (CP) steels, and Bainitic steel (BS). The type of microstructure (F=Ferrite, B=Bainite, M=Martensite, P=Pearlite) for all steel sheets is given in brackets in the legend of FIG. 4. The data shown in FIG. 4 clearly illustrates the benefit of a single-phase ferrite microstructure over a multi-phase microstructure: the hole-expansion ratios of the inventive examples 1A to 28K (Table 4) of the present invention are higher than that of typical commercial steel sheets with multi-phase microstructures and similar tensile strength. FIG. 5 shows a plot of hole-expansion ratio against total elongation (JIS No. 5 geometry) for steel sheets 18E to 21E (Table 4), with maximum tensile strength levels of 800 to 830 MPa. Also shown in FIG. 5 is data for typical hot-rolled CP800, BS800, and E690TM steel sheets with similar maximum tensile strength levels and thickness as steel sheets 18E to 21E. The data convincingly illustrates the superior balance between hole-expansion ratio and total elongation achieved with the present invention. The fully single-phase ferrite microstructure of steel sheets 18E to 21E (inventive examples listed in Table 4) provides a significantly improved balance between hole-expansion ratio and total elongation as compared to multi-phase steels sheets with similar maximum tensile strength levels. FIGS. 6 and 7 show S-N fatigue curves (R=−1) corresponding with data obtained from steel sheets with circa tensile strength of 600-650 and 800-830 MPa, respectively. FIG. 6 shows S-N curves of steel sheets 9B, 10B, and 11B (inventive examples listed in Table 4) compared with typical S-N curves of hot-rolled FB590 and hot-rolled DP600 steel sheets with similar tensile strength and thickness. The data shown in FIG. 6 confirms that a single-phase ferrite microstructure provides considerably higher fatigue strength than steel sheets with a multi-phase microstructure consisting of ferrite and bainite (FB590) or ferrite and martensite (DP600) with similar maximum tensile strength and similar thickness. A similar conclusion is drawn from FIG. 7, showing S-N fatigue curves of steel sheet 22E (inventive example listed in Table 4) in comparison with that of typical S-N fatigue curves of cold-rolled CP800 and cold-rolled DP800. The data shown in FIG. 7 convincingly shows that a single-phase ferrite microstructure offers a considerably higher fatigue strength than steel sheets with a multi-phase microstructure and similar maximum tensile strength.

TABLE 1

Compositions of steels corresponding to example 1.

| Steel | \multicolumn{10}{c|}{Chemical composition (wt %)} | \multicolumn{2}{c|}{Atomic Ratio's**} |
|---|---|---|---|---|---|---|---|---|---|---|---|---|
| | C | Si | Mn | P | S | Al_sol | N | Ti | Nb | V | A | B |
| A | 0.047 | 0.18 | 1.60 | 0.013 | 0.005 | 0.043 | 0.0049 | — | — | 0.200 | 1.00 | 1.29 |
| B | 0.023 | 0.01 | 1.60 | 0.000 | 0.002 | 0.024 | 0.0160 | — | 0.016 | 0.139 | 1.51 | 1.24 |
| C* | 0.051 | 0.19 | 1.63 | 0.014 | 0.006 | 0.036 | 0.0070 | 0.079 | 0.009 | — | 0.41 | 0.65 |
| D* | 0.039 | 0.18 | 1.60 | 0.014 | 0.004 | 0.039 | 0.0042 | — | 0.055 | — | 0.18 | 0.57 |
| E* | 0.073 | 0.21 | 1.55 | 0.012 | 0.005 | 0.036 | 0.0085 | — | 0.071 | 0.077 | 0.37 | 0.54 |

*Comparison (compositions corresponding with comparative examples)
** Atomic ratios
A: (Nb + V + Ti) / C
B: (Nb + V + Ti + Al) / (C + N)

TABLE 3

Compositions of steels corresponding to example 2.

| Steel | C | Si | Mn | P | S | Al_sol | N | Ti | Nb | V | A | B |
|---|---|---|---|---|---|---|---|---|---|---|---|---|
| A | 0.025 | 0.01 | 1.05 | 0.001 | 0.001 | 0.043 | 0.0159 | — | 0.016 | 0.130 | 1.31 | 1.34 |
| B | 0.026 | 0.02 | 1.56 | 0.001 | 0.001 | 0.013 | 0.0118 | — | 0.016 | 0.141 | 1.36 | 1.14 |
| C | 0.035 | 0.01 | 1.55 | 0.001 | 0.001 | 0.013 | 0.0126 | — | 0.017 | 0.179 | 1.27 | 1.10 |
| D | 0.040 | 0.10 | 1.48 | 0.001 | 0.001 | 0.007 | 0.0112 | — | 0.017 | 0.242 | 1.48 | 1.26 |
| E | 0.045 | 0.20 | 1.81 | 0.001 | 0.001 | 0.012 | 0.0142 | — | 0.030 | 0.259 | 1.44 | 1.23 |
| F | 0.035 | 0.02 | 1.57 | 0.001 | 0.001 | 0.010 | 0.0130 | — | 0.015 | 0.150 | 1.07 | 0.90 |
| G | 0.029 | 0.03 | 1.58 | 0.001 | 0.002 | 0.013 | 0.0140 | — | 0.015 | 0.150 | 1.29 | 1.05 |
| H | 0.028 | 0.03 | 1.57 | 0.001 | 0.001 | 0.005 | 0.0130 | — | 0.015 | 0.160 | 1.42 | 1.07 |
| I | 0.033 | 0.02 | 1.58 | 0.008 | 0.004 | 0.013 | 0.0100 | — | 0.016 | 0.150 | 1.13 | 1.04 |
| J | 0.034 | 0.03 | 1.59 | 0.007 | 0.005 | 0.012 | 0.0120 | — | 0.016 | 0.150 | 1.10 | 0.97 |
| K | 0.023 | 0.03 | 1.70 | 0.010 | 0.005 | 0.016 | 0.0150 | — | 0.017 | 0.160 | 1.74 | 1.31 |

* Atomic ratios
A: (Nb + V + Ti) / C
B: (Nb + V + Ti + Al) / (C + N)

TABLE 2

Process conditions, properties and microstructures corresponding to example 1.

| Sheet | Steel | Reheating temperature (° C.) | Finishing rolling temperature (° C.) | Coiling temperature (° C.) | Thickness (mm) | YS (MPa) | UTS (MPa) | YR (—) | El (%) | Hole-expansion ratio $\lambda^2$ av (%) | Hole-expansion ratio $\lambda^2$ max (%) | Fatigue strength $\sigma^3$ (MPa) | Fatigue strength $\sigma^4$ (MPa) | Structure[5] | Example |
|---|---|---|---|---|---|---|---|---|---|---|---|---|---|---|---|
| 1 | A | 1200 | 925 | 650 | 2.8 | 537 | 624 | 0.86 | 20.4 | 125 | 136 | — | — | F | Inventive |
| 2 | B | 1220 | 860 | 630 | 3.0 | 590 | 666 | 0.89 | 19.2 | — | — | — | — | F | Inventive |
| 3 | B | 1220 | 865 | 630 | 2.9 | 601 | 668 | 0.90 | 22.9 | — | — | 938 | 847 | F | Inventive |
| 4 | B | 1220 | 880 | 630 | 2.9 | 603 | 665 | 0.91 | 22.8 | 119 | 129 | — | — | F | Inventive |
| 5 | B | 1220 | 890 | 600 | 2.9 | 619 | 680 | 0.91 | 20.3 | — | — | — | — | F | Inventive |
| 6 | B | 1220 | 865 | 600 | 3.1 | 578 | 655 | 0.88 | 19.9 | — | — | — | — | F | Inventive |
| 7 | B | 1220 | 890 | 600 | 3.0 | 612 | 676 | 0.91 | 19.9 | 110 | 111 | — | — | F | Inventive |
| 8 | C* | 1250 | 905 | 650 | 3.0 | 555 | 634 | 0.88 | 22.2 | 56 | 62 | — | — | F + C + P | Comparative |
| 9 | C* | 1250 | 930 | 600 | 2.9 | 635 | 702 | 0.90 | 17.6 | 47 | 48 | — | — | F + C + P | Comparative |
| 10 | D* | 1200 | 915 | 650 | 3.0 | 510 | 560 | 0.91 | 25.2 | 84 | 86 | — | — | F + C + P | Comparative |
| 11 | D* | 1200 | 900 | 600 | 3.1 | 532 | 592 | 0.90 | 24.2 | 60 | 67 | — | — | F + C + P | Comparative |
| 12 | E* | 1220 | 900 | 630 | 2.5 | 637 | 675 | 0.94 | 24.7 | 37 | — | 755 | 600 | F + C + P | Comparative |

[1]Based on JIS No. 5 tensile test specimen (50 × 25 mm), longitudinal to rolling direction.
[2]Hole-expansion ratio: punched hole with 10 mm diameter, upper burring.
[3]Fatigue strength (defined as stress range) at $1 \times 10^5$ cycles (R = −1).
[4]Fatigue strength (defined as stress range) at $5 \times 10^5$ cycles (R = −1).
[5]Structure is assigned as predominantly ferrite (F) if ferrite fraction is 97% or more. Structure is assigned as ferrite with cementite and pearlite (F + C + P) if fraction cementite and pearlite is more than 3%.
*Comparison

TABLE 4

Process conditions, properties and microstructures corresponding to example 2.

| Sheet | Steel | Hot-rolling conditions | | | | Thickness (mm) | Tensile properties[1] | | | | Hole-expansion ratio λ[2] | | Fatigue strength σ | | Structure[5] | Example |
|---|---|---|---|---|---|---|---|---|---|---|---|---|---|---|---|---|
| | | Reheating temperature (°C.) | Finishing rolling temperature (°C.) | Cooling rate (°C./s) | Coiling temperature (°C.) | | YS (MPa) | UTS (MPa) | YR (—) | El (%) | av (%) | max (%) | σ[3] (MPa) | σ[4] (MPa) | | |
| 1  | A | 1240 | 880 | 50  | 630 | 3.5 | 563 | 624 | 0.90 | 23.3 | 139 | 141 | —    | —   | F | Inventive |
| 2  | A | 1240 | 885 | 50  | 630 | 3.0 | 578 | 645 | 0.90 | 22.7 | 128 | 134 | —    | —   | F | Inventive |
| 3  | A | 1240 | 875 | 100 | 630 | 3.5 | 567 | 618 | 0.92 | 23.8 | 107 | 134 | —    | —   | F | Inventive |
| 4  | A | 1240 | 880 | 100 | 630 | 3.1 | 573 | 624 | 0.92 | 20.6 | 122 | 140 | —    | —   | F | Inventive |
| 5  | B | 1240 | 875 | 50  | 630 | 3.4 | 561 | 634 | 0.88 | 21.9 | 131 | 146 | —    | —   | F | Inventive |
| 6  | B | 1240 | 865 | 50  | 630 | 2.8 | 571 | 648 | 0.88 | 23.5 | 125 | 127 | —    | —   | F | Inventive |
| 7  | B | 1240 | 900 | 100 | 630 | 3.6 | 569 | 630 | 0.90 | 21.9 | 108 | 125 | —    | —   | F | Inventive |
| 8  | B | 1240 | 900 | 100 | 630 | 2.9 | 582 | 644 | 0.90 | 20.3 | 117 | 131 | —    | —   | F | Inventive |
| 9  | B | 1240 | 885 | 50  | 630 | 2.9 | 571 | 645 | 0.89 | 23.0 | —   | —   | 886  | 799 | F | Inventive |
| 10 | B | 1240 | 865 | 50  | 630 | 3.0 | 562 | 647 | 0.87 | 22.6 | —   | —   | 881  | 777 | F | Inventive |
| 11 | B | 1240 | 900 | 100 | 630 | 3.0 | 583 | 640 | 0.91 | 23.0 | —   | —   | 830  | 747 | F | Inventive |
| 12 | C | 1240 | 890 | 100 | 630 | 3.5 | 602 | 683 | 0.88 | 23.1 | 85  | 105 | —    | —   | F | Inventive |
| 13 | C | 1240 | 885 | 100 | 630 | 3.0 | 623 | 697 | 0.89 | 21.3 | 110 | 120 | —    | —   | F | Inventive |
| 14 | D | 1240 | 895 | 50  | 630 | 3.6 | 661 | 757 | 0.87 | 21.3 | 70  | 76  | —    | —   | F | Inventive |
| 15 | D | 1240 | 895 | 50  | 630 | 3.1 | 674 | 771 | 0.87 | 21.1 | 110 | 121 | —    | —   | F | Inventive |
| 16 | D | 1240 | 890 | 100 | 630 | 3.5 | 668 | 752 | 0.89 | 19.7 | 74  | 84  | —    | —   | F | Inventive |
| 17 | D | 1240 | 890 | 100 | 630 | 3.0 | 691 | 769 | 0.90 | 19.7 | 71  | 92  | —    | —   | F | Inventive |
| 18 | E | 1240 | 905 | 50  | 630 | 2.9 | 754 | 826 | 0.91 | 19.1 | 60  | 62  | —    | —   | F | Inventive |
| 19 | E | 1240 | 880 | 50  | 630 | 3.0 | 733 | 816 | 0.90 | 18.8 | 81  | 87  | —    | —   | F | Inventive |
| 20 | E | 1240 | 875 | 100 | 630 | 3.5 | 741 | 804 | 0.92 | 19.3 | 60  | 62  | —    | —   | F | Inventive |
| 21 | E | 1240 | 890 | 100 | 630 | 3.1 | 763 | 821 | 0.93 | 18.7 | 92  | 96  | —    | —   | F | Inventive |
| 22 | E | 1240 | 895 | 50  | 630 | 2.8 | 713 | 821 | 0.87 | 19.3 | —   | —   | 1003 | 769 | F | Inventive |
| 23 | F | 1240 | 920 | 50  | 630 | 2.7 | 602 | 668 | 0.90 | 19.3 | 128 | 136 | —    | —   | F | Inventive |
| 24 | G | 1240 | 930 | 50  | 630 | 2.8 | 588 | 656 | 0.90 | 18.4 | 116 | 160 | —    | —   | F | Inventive |
| 25 | H | 1240 | 910 | 50  | 630 | 2.8 | 588 | 659 | 0.89 | 17.9 | 120 | 130 | —    | —   | F | Inventive |
| 26 | I | 1240 | 920 | 50  | 630 | 2.6 | 595 | 655 | 0.91 | 19.8 | 109 | 123 | —    | —   | F | Inventive |
| 27 | J | 1240 | 910 | 50  | 630 | 2.8 | 596 | 665 | 0.90 | 19.7 | 83  | 95  | —    | —   | F | Inventive |
| 28 | K | 1240 | 910 | 50  | 630 | 2.6 | 601 | 675 | 0.89 | 22.5 | 86  | 94  | —    | —   | F | Inventive |

[1] Based on JIS No. 5 tensile test specimen (50 × 25 mm), longitudinal to rolling direction.
[2] Hole-expansion ratio: punched hole with 10 mm diameter, upper burring.
[3] Fatigue strength (defined as stress range) at $1 \times 10^5$ cycles (R = −1).
[4] Fatigue strength (defined as stress range) at $5 \times 10^5$ cycles (R = −1).
[5] Structure is assigned as predominantly ferrite (F) if ferrite fraction is 97% or more. Structure is assigned as ferrite with cementite and pearlite (F + C + P) if fraction cementite and pearlite is more than 3%.

The invention claimed is:

1. A high-strength hot-rolled steel strip or sheet with maximum tensile strength of 570 to 870 MPa and a hole-expansion ratio of 80% or higher to provide an excellent combination of total elongation, stretch-flange formability, and fatigue resistance, comprising (in weight percent):

between 0.015 and 0.075% C;
between 1.0 and 2.0% Mn;
0.10 to 0.30% V;
optionally between 0.01 and 0.08% Nb;
at most 0.5% Si;
at most 0.06% P;
at most 0.01% S;
at most 0.1% Al_sol;
at most 0.020% N;
Mo at most as an impurity, Mo is not an alloying element;
Ti at most as an impurity, Ti is not an alloying element;
optionally calcium in an amount consistent with a calcium treatment for inclusion control;
balance of Fe and inevitable impurities;

wherein the contents of Nb, V, Al_sol, C and N (in weight percent) satisfy <eq.1a> and <eq.2a>:

$$0.9 \leq \left( \frac{\left(\frac{Nb}{93}\right) + \left(\frac{V}{51}\right) + \left(\frac{Al\_sol}{27}\right)}{\left(\frac{C}{12}\right) + \left(\frac{N}{14}\right)} \right) \leq 2.2 \quad \langle \text{eq. 1} \rangle$$

$$0.9 \leq \left( \frac{\left(\frac{Nb}{93}\right) + \left(\frac{V}{51}\right)}{\left(\frac{C}{12}\right)} \right) \leq 2.0 \quad \langle \text{eq. 2} \rangle$$

wherein the steel sheet has a precipitation-strengthened and predominantly single-phase ferritic microstructure, wherein the microstructure is free of carbon-rich microstructural components pearlite or cementite in which the fraction of ferrite is not lower than 97%.

2. The steel strip or sheet according to claim 1, wherein the microstructure is free from titanium-based precipitates or titanium inclusions and the alloy has at least 0.13% V.

3. The steel strip or sheet according to claim 1, comprising at least one feature selected from the group consisting of:
C at least 0.02%
Mn at least 1.4%
Nb at least 0.015%
Si at most 0.25%
P at most 0.02%
S at most 0.006%

Al_sol at most 0.030%

N at least 0.01%.

4. The steel strip or sheet according to claim 1, comprising at most 0.015% of Al_sol.

5. The steel strip or sheet according to claim 1, wherein the contents of Nb, V, Al_sol, C and N (in weight percent) satisfy <eq.1b> and <eq.2b>:

$$1.1 \le \left( \frac{\left(\frac{Nb}{93}\right) + \left(\frac{V}{51}\right) + \left(\frac{Al\_sol}{27}\right)}{\left(\frac{C}{12}\right) + \left(\frac{N}{14}\right)} \right) \le 2.2 \quad \langle \text{eq. 1b} \rangle$$

$$1.2 \le \left( \frac{\left(\frac{Nb}{93}\right) + \left(\frac{V}{51}\right)}{\left(\frac{C}{12}\right)} \right) \le 2.0. \quad \langle \text{eq. 2b} \rangle$$

6. The steel strip or sheet according to claim 1, with tensile strength of 580 to 870 and hole-expansion ratio of 100% or higher.

7. A high-strength hot-rolled steel strip or sheet with tensile strength of 680 MPa to 870 MPa and a hole-expansion ratio of 80% or higher to provide an excellent combination of total elongation, stretch-flange formability, and fatigue resistance, comprising (in weight percent):

between 0.015 and 0.075% C;

between 1.0 and 2.0% Mn;

0.10 to 0.30% V;

optionally between 0.01 and 0.08% Nb;

at most 0.5% Si;

at most 0.06% P;

at most 0.01% S;

at most 0.1% Al_sol;

at most 0.020% N;

Mo at most as an impurity, Mo is not an alloying element

Ti at most as an impurity, Ti is not an alloying element optionally calcium in an amount consistent with a calcium treatment for inclusion control;

balance of Fe and inevitable impurities;

wherein the contents of Nb, V, Al_sol, C and N (in weight percent) satisfy <eq.1> and <eq.2>:

$$0.9 \le \left( \frac{\left(\frac{Nb}{93}\right) + \left(\frac{V}{51}\right) + \left(\frac{Al\_sol}{27}\right)}{\left(\frac{C}{12}\right) + \left(\frac{N}{14}\right)} \right) \le 2.2 \quad \langle \text{eq. 1} \rangle$$

$$0.9 \le \left( \frac{\left(\frac{Nb}{93}\right) + \left(\frac{V}{51}\right)}{\left(\frac{C}{12}\right)} \right) \le 2.0 \quad \langle \text{eq. 2} \rangle$$

wherein the steel sheet has a precipitation-strengthened and predominantly single-phase ferritic microstructure, wherein the microstructure is free of carbon-rich microstructural components pearlite or cementite in which the fraction of ferrite is not lower than 97%.

8. The steel strip or sheet according to claim 7, wherein the contents of Nb, V, Al_sol, C and N (in weight percent) satisfy <eq.1a> and <eq.2a>:

$$1.0 \le \left( \frac{\left(\frac{Nb}{93}\right) + \left(\frac{V}{51}\right) + \left(\frac{Al\_sol}{27}\right)}{\left(\frac{C}{12}\right) + \left(\frac{N}{14}\right)} \right) \le 2.2 \quad \langle \text{eq. 1a} \rangle$$

$$1.0 \le \left( \frac{\left(\frac{Nb}{93}\right) + \left(\frac{V}{51}\right)}{\left(\frac{C}{12}\right)} \right) \le 2.0. \quad \langle \text{eq. 2a} \rangle$$

9. The steel strip or sheet according to claim 7, with tensile strength of at least 780 MPa.

10. The steel strip or sheet according to claim 1, having tensile strength of at least 650 MPa and in which tensile strength (TS) and total elongation (El), and sheet thickness t (mm) satisfy the equation of $(TS \times El)/t^{0.2} > 10000$.

11. The steel strip or sheet according to claim 1, wherein the steel strip or sheet has a zinc or zinc alloy coating.

12. A method of manufacturing a high strength steel sheet with a tensile strength of between 570 to 870 MPa and a hole-expansion ratio of 80% or higher to provide an excellent combination of formability and fatigue resistance, containing the step of casting a thick or thin slab comprising (in weight percent):

between 0.015 and 0.075% C;

between 1.0 and 2.0% Mn;

0.10 to 0.30% V;

optionally between 0.01 and 0.08% Nb;

at most 0.5% Si;

at most 0.06% P;

at most 0.01% S;

at most 0.1% Al_sol;

at most 0.020% N;

Mo at most as an impurity;

Ti at most as an impurity;

optionally calcium in an amount consistent with a calcium treatment for inclusion control;

balance of Fe and inevitable impurities;

wherein the contents of Nb, V, Al_sol, C and N satisfy <<eq.1a> and <eq.2a>:

$$0.9 \le \left( \frac{\left(\frac{Nb}{93}\right) + \left(\frac{V}{51}\right) + \left(\frac{Al\_sol}{27}\right)}{\left(\frac{C}{12}\right) + \left(\frac{N}{14}\right)} \right) \le 2.2 \quad \langle \text{eq. 1} \rangle$$

$$0.9 \le \left( \frac{\left(\frac{Nb}{93}\right) + \left(\frac{V}{51}\right)}{\left(\frac{C}{12}\right)} \right) \le 2.0 \quad \langle \text{eq. 2} \rangle$$

followed by the step of reheating the solidified slab to a temperature of between 1050 and 1250° C., hot rolling the steel slab and finishing said hot rolling at a finish hot rolling temperature at the $Ar_3$-temperature or higher to produce hot rolled steel sheet, and coiling the hot rolled steel sheet in the temperature range of between 700 and 580° C., wherein the hot rolling is performed in a conventional hot strip mill or in the hot mill of a thin slab caster and direct rolling installation.

13. A method according to claim 12, wherein the hot rolled steel sheet is cooled to the coiling temperature at an average cooling rate of at least 10° C./s and/or at most 600° C./s, wherein the tensile strength the hot rolled steel sheet is at least 680 MPa.

14. A method according to claim 12, wherein the coiled hot rolled steel sheet is subjected to cooling by immersing the coil into water or by actively cooling the coil with a spray of water and the alloy has at least 0.13% V.

15. A part made from the high strength hot-rolled steel sheet according to claim 1.

16. The steel strip or sheet according claim 1, comprising at most 0.010% Al_sol.

17. The steel strip or sheet according to claim 1, wherein the steel strip or sheet is provided with a zinc or zinc alloy coating containing aluminium and/or magnesium as its main alloying elements.

18. A method according to claim 12, wherein the hot rolled steel sheet is cooled to the coiling temperature at an average cooling rate of at least 40° C./s and/or at most 150° C./s.

19. An automotive part, made of the high strength hot-rolled steel sheet according to claim 1, wherein the steel sheet has tensile strength of at least 650 MPa, and in which tensile strength (TS), total elongation (El), and sheet thickness t (mm) satisfy the equation of $(TS \times El)/t^{0.2} > 10000$.

20. The steel strip or sheet according to claim 1, wherein the steel strip or sheet has a zinc or zinc alloy coating, wherein the coating process is performed by hot-dip coating.

21. A high-strength hot-rolled steel strip or sheet with maximum tensile strength of 570 to 870 MPa and a hole-expansion ratio of 80% or higher to provide an excellent combination of total elongation, stretch-flange formability, and fatigue resistance, comprising (in weight percent):

C 0.023-0.047%
Mn 1.05-1.81%
V 0.13-0.259%
Nb 0.01-0.03%
Si 0.01-0.20%
P 0-0.013%
S 0.001-0.005%
Al_sol 0.07-0.043%
N 0.0049-0.0159%
Mo at most as an impurity;
Ti at most as an impurity;
optionally calcium in an amount consistent with a calcium treatment for inclusion control;
balance of Fe and inevitable impurities, wherein the contents of Nb, V, Al_sol, C and N (in weight percent) satisfy <eq.1> and <eq.2>:

$$0.9 \leq \left( \frac{\left(\frac{Nb}{93}\right) + \left(\frac{V}{51}\right) + \left(\frac{Al\_sol}{27}\right)}{\left(\frac{C}{12}\right) + \left(\frac{N}{14}\right)} \right) \leq 1.31 \quad \langle eq. 1 \rangle$$

$$1.0 \leq \left( \frac{\left(\frac{Nb}{93}\right) + \left(\frac{V}{51}\right)}{\left(\frac{C}{12}\right)} \right) \leq 1.74. \quad \langle eq. 2 \rangle$$

22. A method of manufacturing a high strength steel sheet with a tensile strength of between 570 to 870 MPa and a hole-expansion ratio of 80% or higher to provide an excellent combination of formability and fatigue resistance, containing the step of casting a thick or thin slab comprising (in weight percent):

C 0.023-0.047%
Mn 1.05-1.81%
V 0.13-0.259%
Nb 0.01-0.03%
Si 0.01-0.20%
P 0-0.013%
S 0.001-0.005%
Al_sol 0.07-0.043%
N 0.0049-0.0159%
Mo at most as an impurity;
Ti at most as an impurity;
optionally calcium in an amount consistent with a calcium treatment for inclusion control;
balance of Fe and inevitable impurities, wherein the contents of Nb, V, Al_sol, C and N (in weight percent) satisfy <eq.1> and <eq.2>:

$$0.9 \leq \left( \frac{\left(\frac{Nb}{93}\right) + \left(\frac{V}{51}\right) + \left(\frac{Al\_sol}{27}\right)}{\left(\frac{C}{12}\right) + \left(\frac{N}{14}\right)} \right) \leq 1.31 \quad \langle eq. 1 \rangle$$

$$1.0 \leq \left( \frac{\left(\frac{Nb}{93}\right) + \left(\frac{V}{51}\right)}{\left(\frac{C}{12}\right)} \right) \leq 1.74, \quad \langle eq. 2 \rangle$$

wherein the coiling of the hot rolled steel sheet is in the temperature range of 600 to 650° C.

* * * * *

UNITED STATES PATENT AND TRADEMARK OFFICE
CERTIFICATE OF CORRECTION

PATENT NO. : 9,920,391 B2  
APPLICATION NO. : 14/758455  
DATED : March 20, 2018  
INVENTOR(S) : Rolf Arjan Rijkenberg Page 1 of 1

It is certified that error appears in the above-identified patent and that said Letters Patent is hereby corrected as shown below:

In the Claims
In Column 12, Claim 1, Lines 40-50 should read:

$$1.0 \leq \left| \frac{\left(\frac{Nb}{93}\right) + \left(\frac{V}{51}\right) + \left(\frac{Al\_sol}{27}\right)}{\left(\frac{C}{12}\right) + \left(\frac{N}{14}\right)} \right| \leq 2.2 \qquad \text{<eq.1a>}$$

$$1.0 \leq \left| \frac{\left(\frac{Nb}{93}\right) + \left(\frac{V}{51}\right)}{\left(\frac{C}{12}\right)} \right| \leq 2.0 \qquad \text{<eq.2a>}$$

In Column 14, Claim 12, Lines 43-53 should read:

$$1.0 \leq \left| \frac{\left(\frac{Nb}{93}\right) + \left(\frac{V}{51}\right) + \left(\frac{Al\_sol}{27}\right)}{\left(\frac{C}{12}\right) + \left(\frac{N}{14}\right)} \right| \leq 2.2 \qquad \text{<eq.1a>}$$

$$1.0 \leq \left| \frac{\left(\frac{Nb}{93}\right) + \left(\frac{V}{51}\right)}{\left(\frac{C}{12}\right)} \right| \leq 2.0 \qquad \text{<eq.2a>}$$

Signed and Sealed this
Seventh Day of August, 2018

Andrei Iancu
*Director of the United States Patent and Trademark Office*